United States Patent
Chang et al.

(10) Patent No.: US 11,089,612 B2
(45) Date of Patent: Aug. 10, 2021

(54) ON USER EQUIPMENT UPLINK LATENCY IN WIRELESS COMMUNICATIONS

(71) Applicant: MediaTek Inc., Hsinchu (TW)

(72) Inventors: Chiao-Chih Chang, Hsinchu (TW); Chien-Liang Lin, Hsinchu (TW); Jen-Hao Hsueh, Hsinchu (TW); Cheng-Che Chen, Hsinchu (TW); Sheng-Yi Ho, Hsinchu (TW); I-Wei Tsai, Hsinchu (TW); Zhen Jiang, Beijing (CN); Wen-Jean Yang, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/591,512

(22) Filed: Oct. 2, 2019

(65) Prior Publication Data
US 2020/0154457 A1 May 14, 2020

Related U.S. Application Data

(60) Provisional application No. 62/757,242, filed on Nov. 8, 2018.

(51) Int. Cl.
*H04W 72/12* (2009.01)
*H04W 72/14* (2009.01)
*H04L 29/12* (2006.01)
*H04W 28/02* (2009.01)

(52) U.S. Cl.
CPC ..... *H04W 72/1242* (2013.01); *H04L 61/2007* (2013.01); *H04W 28/0278* (2013.01); *H04W 72/14* (2013.01)

(58) Field of Classification Search
CPC .................................................. H04W 72/1242
See application file for complete search history.

(56) References Cited

U.S. PATENT DOCUMENTS

| 10,028,295 B2 | 7/2018 | Rosa et al. | |
|---|---|---|---|
| 2011/0143765 A1* | 6/2011 | Moulsley | H04W 72/0426 455/450 |
| 2013/0044699 A1* | 2/2013 | Eriksson | H04W 72/1289 370/329 |

FOREIGN PATENT DOCUMENTS

| WO | WO 2013085441 A1 | 6/2013 |
| WO | WO 2016007850 A1 | 1/2016 |
| WO | WO 2016055472 A1 | 4/2016 |

OTHER PUBLICATIONS

Taiwan Intellectual Property Office, Office Action for Taiwan Patent Application No. 108138590, dated Aug. 7, 2020.

* cited by examiner

*Primary Examiner* — James P Duffy
(74) *Attorney, Agent, or Firm* — Andy M. Han; Han IP PLLC

(57) ABSTRACT

Examples pertaining to improvement on user equipment (UE) uplink latency in wireless communications are described. When an apparatus is in a special mode, a processor of the apparatus transmits to a network a request for permission to perform an uplink (UL) transmission for a plurality of times. The processor then receives from the network a grant. In response to receiving the grant, the processor performs the UL transmission to the network. In transmitting the request for the plurality of times, the processor transmits the request for the plurality of times at a frequency higher than a frequency at which the request to perform UL transmissions is transmitted to the network when the apparatus is in a normal operational mode.

11 Claims, 6 Drawing Sheets

500

TRANSMIT, BY A PROCESSOR OF AN APPARATUS IN A SPECIAL MODE, TO A NETWORK A REQUEST FOR PERMISSION TO PERFORM AN UPLINK (UL) TRANSMISSION FOR A PLURALITY OF TIMES
510

- TRANSMIT THE REQUEST FOR THE PLURALITY OF TIMES AT A FREQUENCY HIGHER THAN A FREQUENCY AT WHICH THE REQUEST TO PERFORM UL TRANSMISSIONS IS TRANSMITTED TO THE NETWORK WHEN THE APPARATUS IS IN A NORMAL OPERATIONAL MODE

RECEIVE, BY THE PROCESSOR, FROM THE NETWORK A GRANT
520

PERFORM, BY THE PROCESSOR, THE UL TRANSMISSION TO THE NETWORK RESPONSIVE TO RECEIVING THE GRANT
530

```
TRANSMIT, BY A PROCESSOR OF AN APPARATUS IN A SPECIAL MODE, TO A NETWORK A
REQUEST FOR PERMISSION TO PERFORM AN UPLINK (UL) TRANSMISSION FOR A PLURALITY
OF TIMES
610

• TRANSMIT THE REQUEST FOR THE PLURALITY OF TIMES AT A FREQUENCY HIGHER THAN
    A FREQUENCY AT WHICH THE REQUEST TO PERFORM UL TRANSMISSIONS IS
    TRANSMITTED TO THE NETWORK WHEN THE APPARATUS IS IN A NORMAL OPERATIONAL
    MODE

RECEIVE INFORMATION FROM ONE OR MORE INFORMATION SOURCES ASSOCIATED
                               WITH THE APPARATUS
                                       612

PREDICT, BASED ON THE RECEIVED INFORMATION, A NEED TO PERFORM THE UL
                                   TRANSMISSION
                                       614

TRANSMIT THE REQUEST FOR THE PLURALITY OF TIMES RESPONSIVE TO THE
                                     PREDICTING
                                        616
```

```
RECEIVE, BY THE PROCESSOR, FROM THE NETWORK A GRANT
                          620
```

```
PERFORM, BY THE PROCESSOR, THE UL TRANSMISSION TO THE NETWORK RESPONSIVE TO
                          RECEIVING THE GRANT
                                   630
```

FIG. 6

ON USER EQUIPMENT UPLINK LATENCY IN WIRELESS COMMUNICATIONS

CROSS REFERENCE TO RELATED PATENT APPLICATION(S)

The present disclosure is part of a non-provisional application claiming the priority benefit of U.S. Patent Application No. 62/757,242, filed on 8 Nov. 2018, and the present disclosure also claims the priority benefit of China Patent Application No. 201910892447.7, filed on 20 Sep. 2019. Contents of aforementioned applications are herein incorporated by reference in their entirety.

TECHNICAL FIELD

The present disclosure is generally related to mobile communications and, more particularly, to improvement on user equipment (UE) uplink latency in wireless communications.

BACKGROUND

Unless otherwise indicated herein, approaches described in this section are not prior art to the claims listed below and are not admitted as prior art by inclusion in this section.

Under the $3^{rd}$ Generation Partnership Project (3GPP) specifications, a UE sends one or more scheduling requests (SRs) to a base station (e.g., eNB or gNB) when there is uplink (UL) traffic (e.g., data packets) to be transmitted by the UE. In response, the base station replies with an UL grant for the UE to transmit the UL traffic. However, there is typically a delay between the time the UE sends the SR(s) and the time the UE receives the UL grant and, hence, there is usually a latency associated with UL traffic transmission.

To shorten the latency, one approach would be to make improvement on the network side with a short cut with respect to forwarding traffic for packet transmission. Alternatively, another approach would be for the network to recognize the Subscriber Identity Module (SIM) card of a UE and provide low-latency mode for that UE. Nevertheless, such approaches would require support from the internet service provider (ISP), which can be costly for the end user.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure aims to provide schemes, solutions, concepts, designs, methods and systems pertaining to improvement on UE uplink latency in wireless communications. In particular, the present disclosure aims to provide cost-effective solutions to achieve improvement on UE uplink latency in wireless communications.

In one aspect, a method may involve a processor of an apparatus in a special mode transmitting, to a network, a request for permission to perform an UL transmission for a plurality of times. The method may also involve the processor receiving, from the network, a grant. The method may further involve the processor performing the UL transmission to the network in response to receiving the grant. In transmitting the request for the plurality of times, the method may involve the processor transmitting the request for the plurality of times at a frequency higher than a frequency at which the request to perform UL transmissions is transmitted to the network when the apparatus is in a normal operational mode.

In another aspect, a method may involve a processor of an apparatus in a special mode transmitting, to a network, a request for permission to perform an UL transmission for a plurality of times. The method may also involve the processor receiving, from the network, a grant. The method may further involve the processor performing the UL transmission to the network in response to receiving the grant. In transmitting the request for the plurality of times, the method may involve the processor transmitting the request for the plurality of times at a frequency higher than a frequency at which the request to perform UL transmissions is transmitted to the network when the apparatus is in a normal operational mode. The special mode may be an event-triggered mode. In transmitting the request in the event-triggered mode, the method may involve the processor performing operations including: (i) receiving information from one or more information sources associated with the apparatus; (ii) predicting, based on the received information, a need to perform the UL transmission; and (iii) transmitting the request for the plurality of times in response to the predicting.

In yet another aspect, an apparatus may include a processor which, during operation, may perform certain operations including: (i) transmitting, when the apparatus is in a special mode, to a network a request for permission to perform an UL transmission for a plurality of times; (ii) receiving from the network a grant; and (iii) performing the UL transmission to the network in response to receiving the grant. In transmitting the request for the plurality of times, the processor may transmit the request for the plurality of times at a frequency higher than a frequency at which the request for perform to perform UL transmissions is transmitted to the network when the apparatus is in a normal operational mode.

It is noteworthy that, although description provided herein may be in the context of certain radio access technologies, networks and network topologies such as 5th Generation (5G) and New Radio (NR), the proposed concepts, schemes and any variation(s)/derivative(s) thereof may be implemented in, for and by other types of radio access technologies, networks and network topologies such as, for example and without limitation, LTE, LTE-Advanced, LTE-Advanced Pro, UMTS and GSM. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 5 is a flowchart of an example process in accordance with an implementation of the present disclosure.

FIG. 6 is a flowchart of an example process in accordance with an implementation of the present disclosure.

DETAILED DESCRIPTION OF PREFERRED IMPLEMENTATIONS

Figure 1:
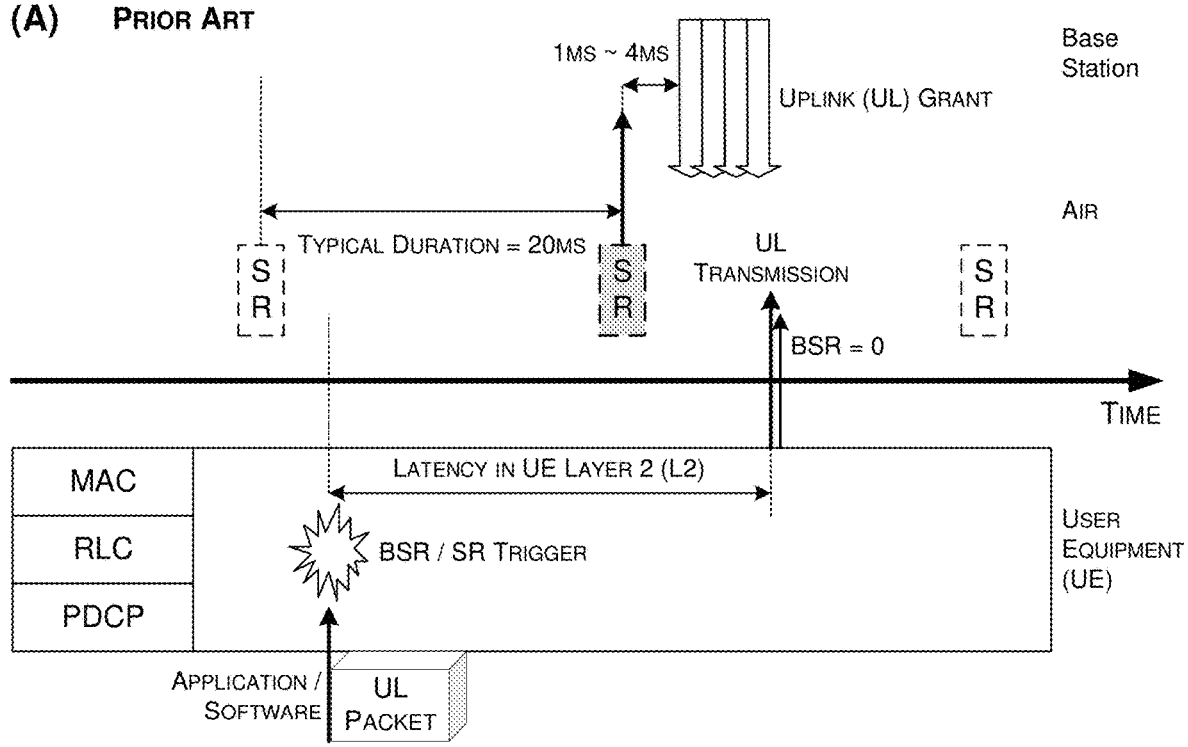
FIG. 1 is a diagram of an example scenario in which a proposed scheme in accordance with the present disclosure may be implemented.
Figure 1:
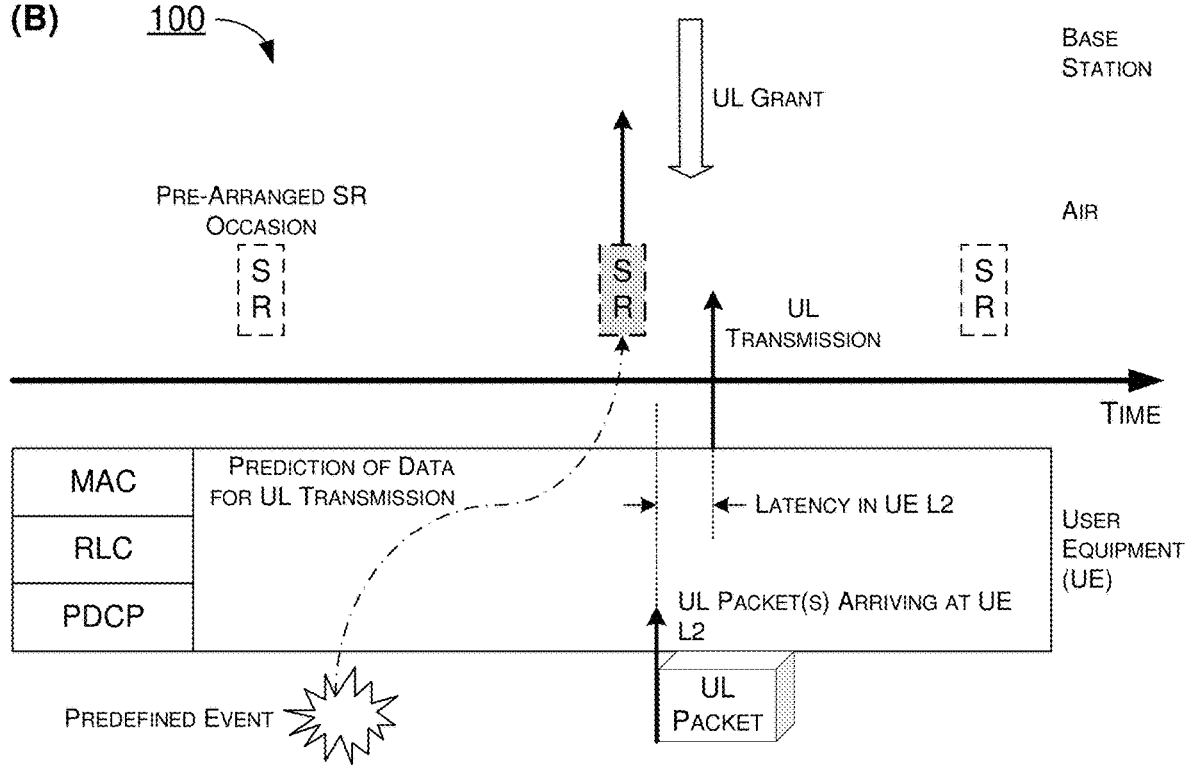

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to improvement on UE uplink latency in wireless communications. According to the present disclosure, a number of possible solutions may be implemented separately or jointly. That is, although these possible solutions may be described below separately, two or more of these possible solutions may be implemented in one combination or another.

Under various schemes proposed in the present disclosure, latency of network traffic between a UE and a base station may be shortened or otherwise improved. The term "latency" herein refers to the lapse in time between the time data for uplink transmission arrives at layer 2 (L2) of a UE and the time of uplink transmission of such data. Under the proposed schemes, the UE may transmit a scheduling request (SR) or a non-zero buffer status report (BSR) to the base station in advance before the UE actually has data packets queued up for UL transmission to the base station. In particular, when in an event-triggered mode, the UE may transmit an SR and/or a non-zero BSR to the base station upon occurrence of any of a number of predefined events such as, for example and without limitation, detection of a touch of a screen of the UE, activation of or performing of an operation by a gyroscope of the UE, activation of or performing of an operation by an accelerometer of the UE, detection of a press of a key on the UE, receiving of an input by another device of the UE, detection of an occurrence of a hardware event with respect to a hardware of the UE, and detection of an occurrence of a software flow with respect to a software executed on the UE. Additionally, when in a forced mode, the UE may keep transmitting (e.g., continuously or periodically) SRs and/or non-zero BSRs to the base station even when the UE is not aware of any user data available for UL transmission. The timing of the forced mode may be configured with timeout or receive start/stop event(s). Moreover, when in a background mode, the UE may transmit an SR or a non-zero BSR whenever the UE is aware of data packets available for UL transmission. The background mode does not rely on control of SR/BSR directly, yet the UE may transmit SRs and/or BSRs rather often and real traffic may benefit from this behavior. The aim for this kind of background traffic is to improve the latency on purpose regardless of the size and interval or usage of the data packets to be transmitted. Accordingly, the background mode may be configured as a default mode in which the UE operates.

Under a proposed scheme, there may be a mechanism to handle prediction miss for both the event-triggered mode and forced mode. Under the proposed scheme, when an UL grant is received from the base station while there is no data for UL transmission, the UE may still transmit some information for UL traffic. For example, the UE may transmit modem medium access control (MAC) padding, which may be configured as a frequency-based transmission parameter or a threshold configuration. As another example, the UE may transmit modem layer 2 (L2) control data, retransmission data or an invalid protocol data unit (PDU). As yet another example, the UE may transmit real networking dummy data such as, for example and without limitation, private Internet Protocol (IP) address data which would be dropped by any router upon receipt, an IP packet data designated for a predetermined IP address or a random IP address, with a time-to-live (TTL) value of the IP packet data less than a predefined TTL value, or a service data designated for a predetermined or specific server.

FIG. 1 illustrates an example scenario 100 in which a proposed scheme in accordance with the present disclosure may be implemented. For comparison and to aid better appreciation of advantages and benefits associated with the proposed scheme, part (A) of FIG. 1 illustrates a conventional approach while part (B) of FIG. 1 illustrates scenario 100 according to the proposed scheme.

Referring to part (A) of FIG. 1, under the conventional approach, the default behavior of a UE is to transmit an SR and/or BSR when there is user data available for UL transmission (e.g., by the user data arriving at layer 2 of a modem of the UE). Under the conventional approach, time slots for transmission of SRs are typically pre-arranged. For instance, the duration between the transmission of two adjacent SRs is typically 20 milliseconds (ms). Once the UE transmits an SR, a base station may keep sending UL grants to the UE until the UE transmits a zero BSR (with value=0 in the BSR).

Referring to part (B) of FIG. 1, under the proposed scheme for UE behavior in an event-triggered mode, upon detection of any one of a plurality of predefined trigger events (e.g., touch of a touch-sensing screen of the UE or launch of a game app on the UE), a prediction indication may be provided to layer 2 (MAC layer) of the modem of the UE (through the Packet Data Convergence Protocol (PDCP) layer and the Radio Link Control (RLC) layer) for early preparation of UL transmission resource(s). As a result, the UE may transmit an SR to the base station to request for permission for UL transmission, and this may occur before arrival of packet(s) of user data at layer 2 for UL transmission. Once an UL grant is received from the base station, the UE may perform UL transmission of the packet(s) of user data with a short latency between the time of arrival of data for UL transmission at layer 2 and the time of UL transmission of such data due to early preparation of UL transmission resource(s).

Figure 2:
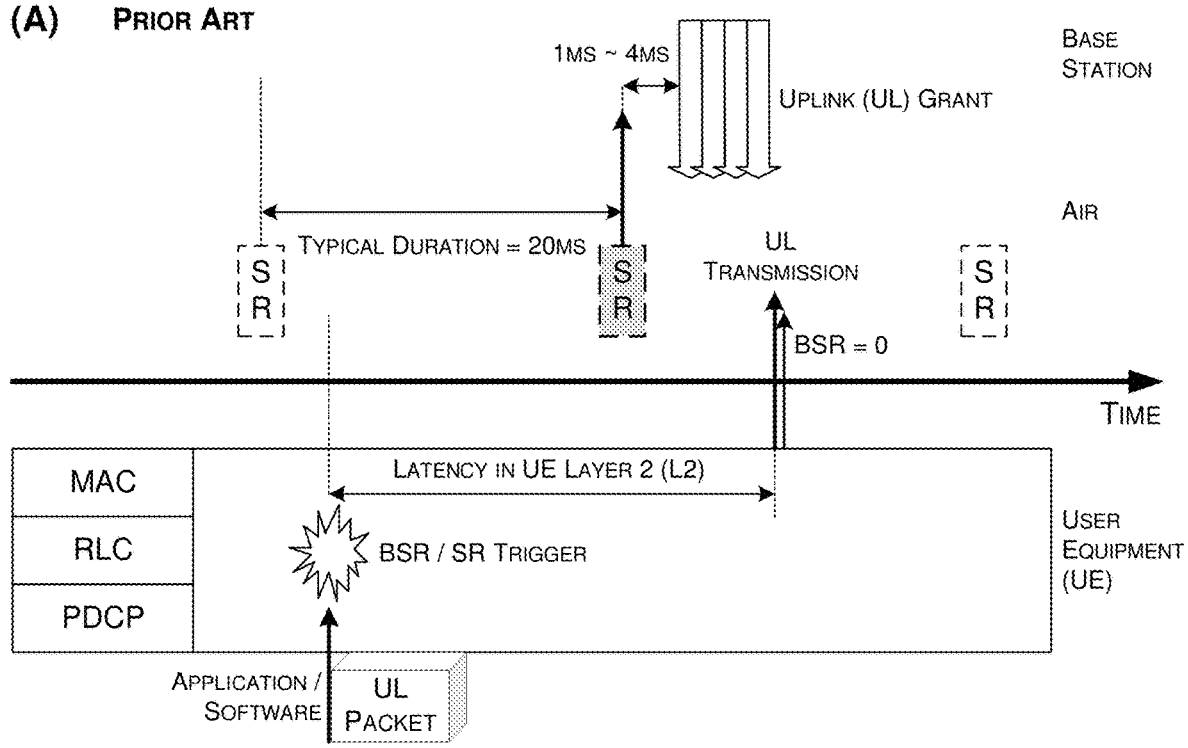
FIG. 2 is a diagram of an example scenario in which a proposed scheme in accordance with the present disclosure may be implemented.
Figure 2:
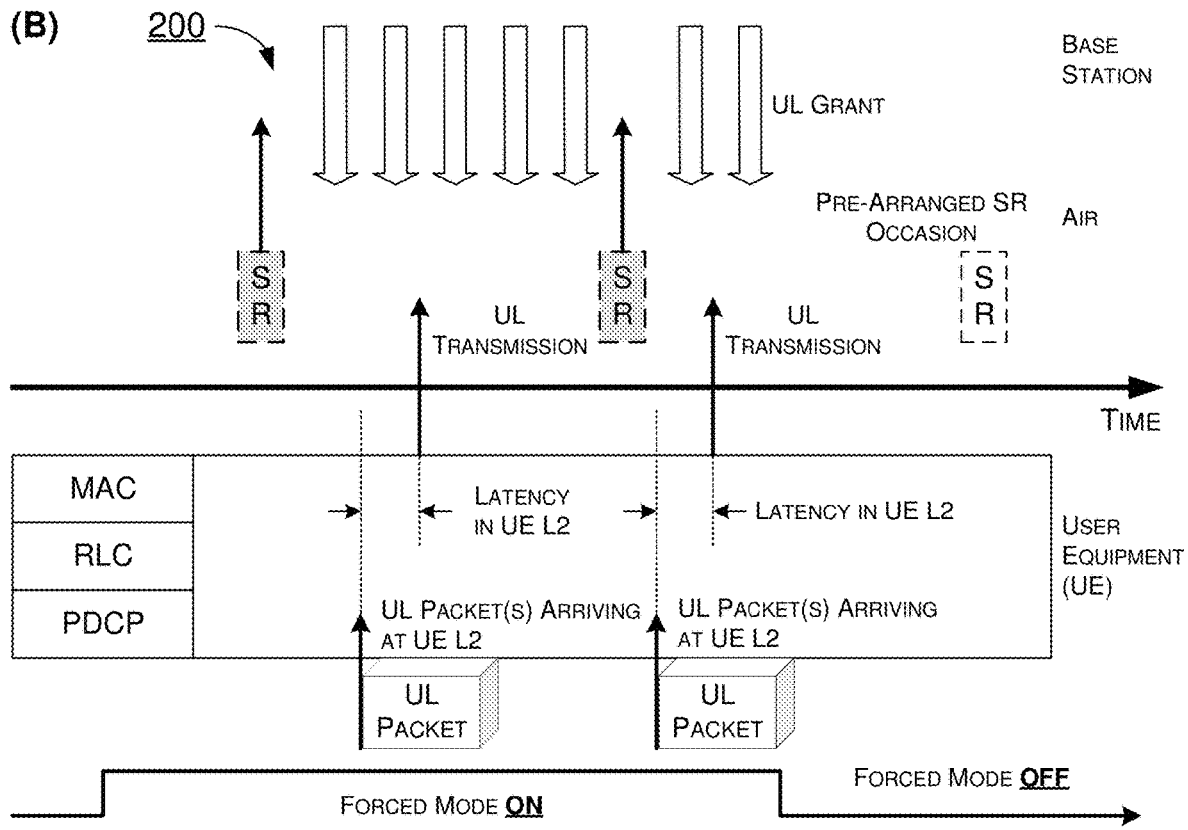

FIG. 2 illustrates an example scenario 200 in which a proposed scheme in accordance with the present disclosure may be implemented. For comparison and to aid better appreciation of advantages and benefits associated with the proposed scheme, part (A) of FIG. 2 illustrates a conventional approach while part (B) of FIG. 2 illustrates scenario 200 according to the proposed scheme.

Referring to part (A) of FIG. 2, under the conventional approach, the default behavior of a UE is to transmit an SR and/or BSR when there is user data available for UL transmission (e.g., by the user data arriving at layer 2 of a modem of the UE). Under the conventional approach, time slots for transmission of SRs are typically pre-arranged. Once the UE transmits an SR, a base station may keep sending UL grants to the UE until the UE transmits a zero BSR (with value=0 in the BSR).

Referring to part (B) of FIG. 2, under the proposed scheme for UE behavior in a forced mode, the UE may operate in the forced mode (denoted as "forced mode ON" in FIG. 2) for a period of time and out of the forced mode (denoted as "forced mode OFF" in FIG. 2) for another period of time, and so on. When in the forced mode, layer 2 of the modem of the UE may always prepare UL transmission resource(s) even when there is no data available for UL transmission. As a result, the UE may still transmit an SR to the base station to request for permission for UL transmission even when there is no data available for UL transmission. In response, the UE may continuously or periodically receive UL grants from the base station. Consequently, as user data for UL transmission becomes available (e.g., user data arriving at layer 2 of the modem), the UE may perform UL transmission of packet(s) of user data with a short latency between the time of arrival of data for UL transmission at layer 2 and the time of UL transmission of such data due to early preparation of UL transmission resource(s). At some point in time, the UE may exit the forced mode and, accordingly, the UE may stop preparation of UL transmission resource(s) as well as transmission of SRs/BSRs when there is no data for UL transmission.

Figure 3:
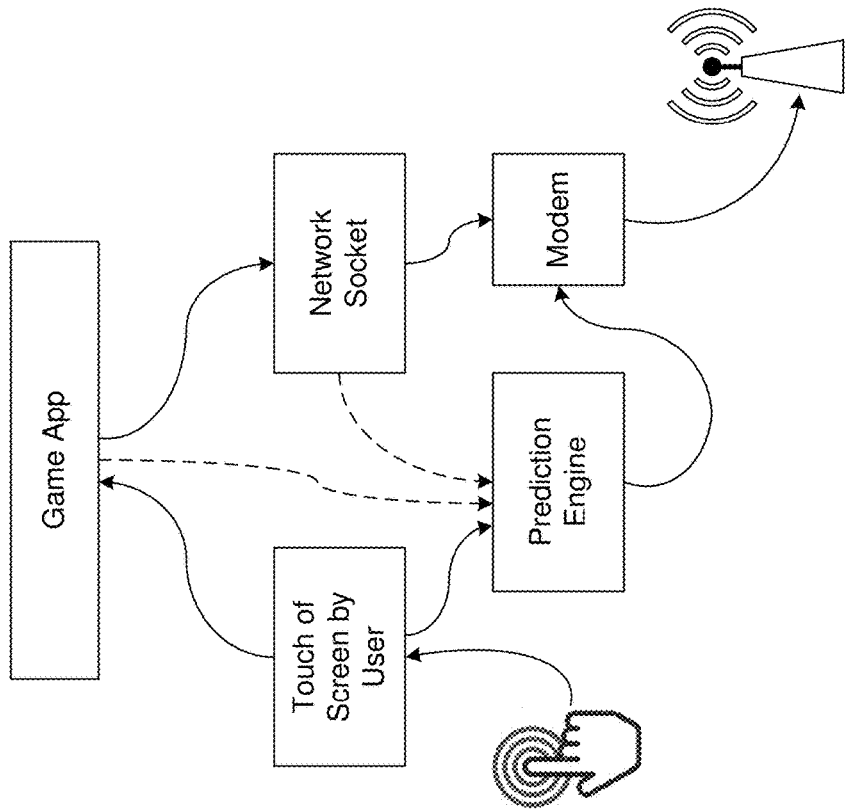
FIG. 3 is a diagram of an example scenario in which a proposed scheme in accordance with the present disclosure may be implemented.
Figure 3:
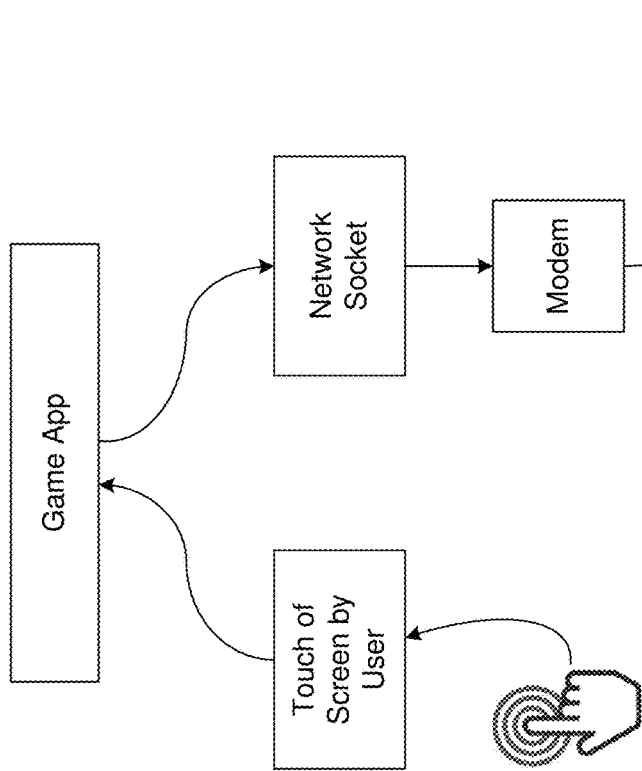

FIG. 3 illustrates an example scenario 300 in which a proposed scheme in accordance with the present disclosure may be implemented. For comparison and to aid better appreciation of advantages and benefits associated with the proposed scheme, part (A) of FIG. 3 illustrates a conventional approach while part (B) of FIG. 3 illustrates scenario 300 according to the proposed scheme. It is noteworthy that, for simplicity, the examples shown in FIG. 3 are provided in the context of a touch of a touch-sensing screen by a user in connection with a game app on the UE, although the proposed scheme may be applied to other scenarios and contexts.

Referring to part (A) of FIG. 3, under the conventional approach, as a touch event (e.g., touching of a touch-sensing screen of a UE by a user) is detected, a game app on the UE may be launched. Accordingly, an indication of the launch of the game app is provided to a network socket of the UE which, in turn, notifies a modem of the UE. The modem then transmits an SR to a base station to request for permission for UL transmission.

Referring to part (B) of FIG. 3, a result of the detection of the touch event may also be provided to a prediction engine or control unit (denoted as "prediction engine" in FIG. 3) in a processor of the UE for prediction behavior on the part of the UE under the event-triggered mode, forced mode, or background mode as described above. Moreover, an indication of the launch of the game app may also be provided to the prediction engine or control unit for prediction behavior on the part of the UE under the event-triggered mode, forced mode, or background mode as described above. Furthermore, the network socket may also inform the prediction engine or control unit for prediction behavior on the part of the UE under the event-triggered mode, forced mode, or background mode as described above. That is, one, some or all of the event-triggered mode, forced mode, and background mode as described above may be utilized or otherwise implemented in the UE at any given time.

Illustrative Implementations

Figure 4:
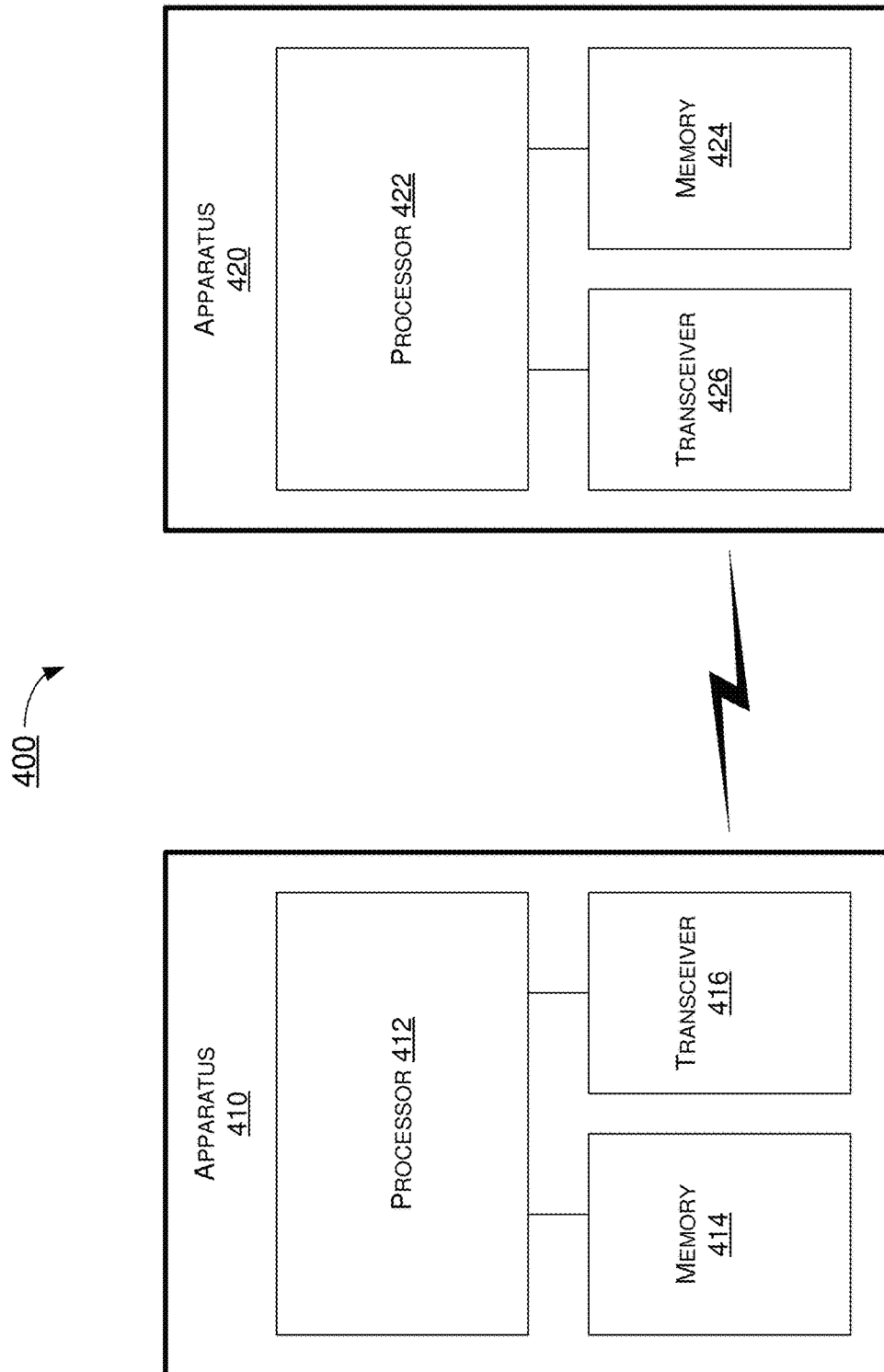
FIG. 4 is a block diagram of an example communication apparatus and an example network apparatus in accordance with an implementation of the present disclosure.

FIG. 4 illustrates an example communication environment 400 having an example apparatus 410 and an example apparatus 420 in accordance with an implementation of the present disclosure. Each of apparatus 410 and apparatus 420 may perform various functions to implement schemes, techniques, processes and methods described herein pertaining to improvement on UE uplink latency in wireless communications, including various schemes described above as well as processes 500 and 600 described below.

Each of apparatus 410 and apparatus 420 may be a part of an electronic apparatus, which may be a UE such as a portable or mobile apparatus, a wearable apparatus, a wireless communication apparatus or a computing apparatus. For instance, each of apparatus 410 and apparatus 420 may be implemented in a smartphone, a smartwatch, a personal digital assistant, a digital camera, or a computing equipment such as a tablet computer, a laptop computer or a notebook computer. Each of apparatus 410 and apparatus 420 may also be a part of a machine type apparatus, which may be an IoT or NB-IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. Alternatively, each of apparatus 410 and apparatus 420 may be implemented in the form of one or more integrated-circuit (IC) chips such as, for example and without limitation, one or more single-core processors, one or more multi-core processors, or one or more complex-instruction-set-computing (CISC) processors. Each of apparatus 410 and apparatus 420 may include at least some of those components shown in FIG. 4 such as a processor 412 and a processor 422, respectively. Each of apparatus 410 and apparatus 420 may further include one or more other components not pertinent to the proposed scheme of the present disclosure (e.g., internal power supply, display device and/or user interface device), and, thus, such component(s) of each of apparatus 410 and apparatus 420 are neither shown in FIG. 4 nor described below in the interest of simplicity and brevity.

In some implementations, at least one of apparatus 410 and apparatus 420 may be a part of an electronic apparatus, which may be a network node or base station (e.g., eNB, gNB or transmit/receive point (TRP)), a small cell, a router or a gateway. For instance, at least one of apparatus 410 and apparatus 420 may be implemented in an eNodeB in an LTE, LTE-Advanced or LTE-Advanced Pro network, in a gNB in a 5G, NR, IoT or NB-IoT network, or in an access point in a wireless local area network (WLAN). Alternatively, at least one of apparatus 410 and apparatus 420 may be implemented in the form of one or more IC chips such as, for example and without limitation, one or more single-core processors, one or more multi-core processors, or one or more CISC processors.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including implementation of improvement on UE uplink latency in wireless communications in accordance with various implementations of the present disclosure.

In some implementations, apparatus 410 may also include a transceiver 416 coupled to processor 412 and capable of wirelessly transmitting and receiving data. In some implementations, apparatus 410 may further include a memory 414 coupled to processor 412 and capable of being accessed by processor 412 and storing data therein. In some implementations, apparatus 420 may also include a transceiver 426 coupled to processor 422 and capable of wirelessly transmitting and receiving data. In some implementations, apparatus 420 may further include a memory 424 coupled to processor 422 and capable of being accessed by processor 422 and storing data therein. Accordingly, apparatus 410 and apparatus 420 may wirelessly communicate with each other via transceiver 416 and transceiver 426, respectively.

To aid better understanding, the following description of the operations, functionalities and capabilities of each of apparatus 410 and apparatus 420 is provided in the context of a mobile communication environment in which apparatus 410 is implemented in or as a wireless communication device, a communication apparatus or a UE and apparatus 420 is implemented in or as a network node connected or otherwise communicatively coupled to a wireless network (e.g., a 5G NR mobile network or LTE/LTE-Advanced/LTE-Advanced Pro mobile network).

In one aspect of improvement on UE uplink latency in wireless communications, processor 412 of apparatus 410 as a UE may transmit, via transceiver 416 and while apparatus 410 is in a special mode, to a network (e.g., via apparatus 420) a request for permission to perform an UL transmission for a plurality of times. For instance, processor 412 may transmit the request for the plurality of times at a frequency higher than a frequency at which the request to perform UL transmissions is transmitted to the network when apparatus 410 is in a normal operational mode. Moreover, processor 412 may receive, via transceiver 416, from the network (e.g., via apparatus 420) a grant for UL transmission. Furthermore, processor 412 may perform, via transceiver 416, the UL transmission to the network (e.g., via apparatus 420) in response to receiving the grant.

In some implementations, in transmitting the request, processor 412 may transmit a scheduling request (SR).

In some implementations, in transmitting the request, processor 412 may transmit a non-zero buffer status report (BSR).

In some implementations, the special mode may be a forced mode. In such cases, in transmitting the request in the forced mode, processor 412 may perform certain operations. For instance, processor 412 may enter the forced mode. Additionally, processor 412 may continuously transmit the request for the plurality of times while in the forced mode without knowledge of any user data available for the UL transmission. Moreover, processor 412 may exit, in response to an occurrence of any of a plurality of predefined events, the forced mode to stop the continuously transmitting of the request. In some implementations, the plurality of predefined events may include the following: (1) expiration of a predetermined period for being in the forced mode; (2) receiving an input to start one operation; and (3) receiving another input to stop another operation.

In some implementations, in performing the UL transmission, processor 412 may perform certain operations. For instance, processor 412 may determine that there is no buffered data to be transmitted in the UL transmission. Furthermore, processor 412 may perform the UL transmission of any of the following: (a) a modem medium access control (MAC) padding; (b) a modem layer 2 control data, retransmission data or an invalid protocol data unit (PDU); and (c) network dummy data. In some implementations, the modem MAC padding may be configured as a frequency-based transmission parameter or a threshold configuration. In such cases, the networking dummy data may include any of the following: (i) a private Internet Protocol (IP) address data; (ii) an IP packet data designated for a predetermined IP address or a random IP address, with a time-to-live (TTL) value of the IP packet data less than a predefined TTL value; and (iii) a service data designated for a predetermined server.

In some implementations, the special mode may be a background mode. In such cases, in transmitting the request in the background mode, processor 412 may perform certain operations. For instance, processor 412 may receive an indication of availability of one or more packets of data for the UL transmission. Moreover, processor 412 may transmit the request for the plurality of times in response to receiving the indication.

In some implementations, the special mode may be a background mode. In such cases, in transmitting the request in the background mode, processor 412 may perform certain operations. For instance, processor 412 may transmit lower-priority data continuously or periodically to maintain UL transmission grants unless there is higher-priority data to be transmitted. Additionally, processor 412 may transmit the higher-priority data, in lieu of the lower-priority data, when the higher-priority data is available from an application.

In some implementations, the special mode may be an event-triggered mode. In such cases, in transmitting the request in the event-triggered mode, processor 412 may perform certain operations. For instance, processor 412 may receive information from one or more information sources associated with apparatus 410. Additionally, processor 412 may predict, based on the received information, a need to perform the UL transmission. Moreover, processor 412 may transmit the request for the plurality of times in response to the predicting.

In some implementations, in predicting the need to perform the UL transmission, processor 412 may detect at least one of a plurality of predefined events based on the received information. In some implementations, the plurality of predefined events may include the following: (a) detection of a touch of a screen of apparatus 410; (b) activation of or performing of an operation by a gyroscope of apparatus 410; (c) activation of or performing of an operation by an accelerometer of apparatus 410; (d) detection of a press of a key on apparatus 410; (e) receiving of an input by another device of apparatus 410; (f) detection of an occurrence of a hardware event with respect to a hardware of apparatus 410; and (g) detection of an occurrence of a software flow with respect to a software executed on apparatus 410.

Illustrative Processes

FIG. 5 illustrates an example process 500 in accordance with an implementation of the present disclosure. Process 500 may be an example implementation of the proposed schemes described above with respect to improvement on UE uplink latency in wireless communications in accordance with the present disclosure. Process 500 may represent an aspect of implementation of features of apparatus 410 and apparatus 420. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 410, apparatus 420 and/or any suitable wireless communication device, UE, base station or machine type devices. Solely for illustrative purposes and without limitation, process 500 is described below in the context of apparatus 410 as a UE (e.g., UE 110) and apparatus 420 as a network node (e.g., access point, eNB or gNB) of a wireless network (e.g., a Wi-Fi basic service set (BSS), an NR cell, an LTE cell or a UMTS cell). Process 500 may begin at block 510.

At 510, process 500 may involve processor 412 of apparatus 410 as a UE transmitting, via transceiver 416 and while apparatus 410 is in a special mode, to a network (e.g., via apparatus 420) a request for permission to perform an UL transmission for a plurality of times. For instance, process 500 may involve processor 412 transmitting the request for the plurality of times at a frequency higher than a frequency at which the request to perform UL transmissions is transmitted to the network when apparatus 410 is in a normal operational mode. Process 500 may proceed from 510 to 520.

At 520, process 500 may involve processor 412 receiving, via transceiver 416, from the network (e.g., via apparatus 420) a grant for UL transmission. Process 500 may proceed from 520 to 530.

At 530, process 500 may involve processor 412 performing, via transceiver 416, the UL transmission to the network (e.g., via apparatus 420) in response to receiving the grant.

In some implementations, in transmitting the request, process 500 may involve processor 412 transmitting a scheduling request (SR).

In some implementations, in transmitting the request, process 500 may involve processor 412 transmitting a non-zero buffer status report (BSR).

In some implementations, the special mode may be a forced mode. In such cases, in transmitting the request in the forced mode, process 500 may involve processor 412 performing certain operations. For instance, process 500 may involve processor 412 entering the forced mode. Additionally, process 500 may involve processor 412 continuously transmitting the request for the plurality of times while in the forced mode without knowledge of any user data available for the UL transmission. Moreover, process 500 may involve processor 412 exiting, in response to an occurrence of any of a plurality of predefined events, the forced mode to stop the continuously transmitting of the request. In some implementations, the plurality of predefined events may include the following: (1) expiration of a predetermined period for being in the forced mode; (2) receiving an input to start one operation; and (3) receiving another input to stop another operation.

In some implementations, in performing the UL transmission, process 500 may involve processor 412 performing certain operations. For instance, process 500 may involve processor 412 determining that there is no buffered data to be transmitted in the UL transmission. Furthermore, process 500 may involve processor 412 performing the UL transmission of any of the following: (a) a modem medium access control (MAC) padding; (b) a modem layer 2 control data, retransmission data or an invalid protocol data unit (PDU); and (c) network dummy data. In some implementations, the modem MAC padding may be configured as a frequency-based transmission parameter or a threshold configuration. In such cases, the networking dummy data may include any of the following: (i) a private Internet Protocol (IP) address data; (ii) an IP packet data designated for a predetermined IP address or a random IP address, with a time-to-live (TTL) value of the IP packet data less than a predefined TTL value; and (iii) a service data designated for a predetermined server.

In some implementations, the special mode may be a background mode. In such cases, in transmitting the request in the background mode, process 500 may involve processor 412 performing certain operations. For instance, process 500 may involve processor 412 receiving an indication of availability of one or more packets of data for the UL transmission. Moreover, process 500 may involve processor 412 transmitting the request for the plurality of times in response to receiving the indication.

In some implementations, the special mode may be a background mode. In such cases, in transmitting the request in the background mode, process 500 may involve processor 412 performing certain operations. For instance, process 500 may involve processor 412 transmitting lower-priority data continuously or periodically to maintain UL transmission grants unless there is higher-priority data to be transmitted. Additionally, process 500 may involve processor 412 transmitting the higher-priority data, in lieu of the lower-priority data, when the higher-priority data is available from an application.

FIG. 6 illustrates an example process 600 in accordance with an implementation of the present disclosure. Process 600 may be an example implementation of the proposed schemes described above with respect to improvement on UE uplink latency in wireless communications in accordance with the present disclosure. Process 600 may represent an aspect of implementation of features of apparatus 410 and apparatus 420. Process 600 may include one or more operations, actions, or functions as illustrated by one or more of blocks 610, 620 and 630 as well as sub-blocks 612, 614 and 616. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may also be repeated partially or entirely. Process 600 may be implemented by apparatus 410, apparatus 420 and/or any suitable wireless communication device, UE, base station or machine type devices. Solely for illustrative purposes and without limitation, process 600 is described below in the context of apparatus 410 as a UE (e.g., UE 110) and apparatus 420 as a network node (e.g., access point, eNB or gNB) of a wireless network (e.g., a Wi-Fi BSS, an NR cell, an LTE cell or a UMTS cell). Process 600 may begin at block 610.

At 610, process 600 may involve processor 412 of apparatus 410 as a UE transmitting, via transceiver 416 and while apparatus 410 is in a special mode, to a network (e.g., via apparatus 420) a request for permission to perform an UL transmission for a plurality of times. For instance, process 600 may involve processor 412 transmitting the request for the plurality of times at a frequency higher than a frequency at which the request to perform UL transmissions is transmitted to the network when apparatus 410 is in a normal operational mode. Process 600 may proceed from 610 to 620.

At 620, process 600 may involve processor 412 receiving, via transceiver 416, from the network (e.g., via apparatus 420) a grant for UL transmission. Process 600 may proceed from 620 to 630.

At 630, process 600 may involve processor 412 performing, via transceiver 416, the UL transmission to the network (e.g., via apparatus 420) in response to receiving the grant In some implementations, the special mode may be an event-triggered mode. In such cases, in transmitting the request in the event-triggered mode, process 600 may involve processor 412 performing certain operations as represented by 612, 614 and 616.

At 612, process 600 may involve processor 412 receiving information from one or more information sources associated with apparatus 410. Process 600 may proceed from 612 to 614.

At 614, process 600 may involve processor 412 predicting, based on the received information, a need to perform the UL transmission. Process 600 may proceed from 614 to 616.

At 616, process 600 may involve processor 412 transmitting the request for the plurality of times in response to the predicting.

In some implementations, in predicting the need to perform the UL transmission, process 600 may involve processor 412 detecting at least one of a plurality of predefined events based on the received information. In some implementations, the plurality of predefined events may include the following: (a) detection of a touch of a screen of apparatus 410; (b) activation of or performing of an operation by a gyroscope of apparatus 410; (c) activation of or performing of an operation by an accelerometer of apparatus 410; (d) detection of a press of a key on apparatus 410; (e) receiving of an input by another device of apparatus 410; (f) detection of an occurrence of a hardware event with respect to a hardware of apparatus 410; and (g) detection of an occurrence of a software flow with respect to a software executed on apparatus 410.

In some implementations, in performing the UL transmission, process 600 may involve processor 412 performing certain operations. For instance, process 600 may involve processor 412 determining that there is no buffered data to be transmitted in the UL transmission. Furthermore, process 600 may involve processor 412 performing the UL transmission of any of the following: (a) a modem MAC padding; (b) a modem layer 2 control data, retransmission data or an invalid PDU; and (c) network dummy data. In some implementations, the modem MAC padding may be configured as a frequency-based transmission parameter or a threshold configuration. In some implementations, the networking dummy data may include any of the following: (i) a private IP address data; (ii) an IP packet data designated for a predetermined IP address or a random IP address, with a TTL value of the IP packet data less than a predefined TTL value; and (iii) a service data designated for a predetermined server.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting, by a processor of an apparatus in a special mode, to a network a request for permission to perform an uplink (UL) transmission for a plurality of times;
   receiving, by the processor, from the network a grant; and
   performing, by the processor, the UL transmission to the network responsive to receiving the grant,
   wherein the transmitting of the request for the plurality of times comprises transmitting the request for the plurality of times at a frequency higher than a frequency at which the request to perform UL transmissions is transmitted to the network when the apparatus is in a normal operational mode,
   wherein the special mode is a forced mode or a background mode,
   wherein, responsive to the special mode being the forced mode, the transmitting of the request in the forced mode comprises:
      entering the forced mode;
      continuously transmitting the request for the plurality of times while in the forced mode without knowledge of any user data available for the UL transmission; and
      exiting, responsive to an occurrence of any of a plurality of predefined events, the forced mode to stop the continuously transmitting of the request,
   wherein, responsive to the special mode being the background mode, the transmitting of the request in the background mode comprises:
      transmitting lower-priority data continuously or periodically to maintain UL transmission grants unless there is higher-priority data to be transmitted; and
      transmitting the higher-priority data, in lieu of the lower-priority data, when the higher-priority data is available from an application.

2. The method of claim 1, wherein the transmitting of the request comprises transmitting a scheduling request (SR).

3. The method of claim 1, wherein the transmitting of the request comprises transmitting a non-zero buffer status report (BSR).

4. The method of claim 1, wherein the plurality of predefined events comprise:
   expiration of a predetermined period for being in the forced mode;
   receiving an input to start one operation; and
   receiving another input to stop another operation.

5. The method of claim 1, wherein the performing of the UL transmission comprises:
   determining that there is no buffered data to be transmitted in the UL transmission; and
   performing the UL transmission of any of:
      a modem medium access control (MAC) padding;
      a modem layer 2 control data, retransmission data or an invalid protocol data unit (PDU); and
      network dummy data.

6. The method of claim 5, wherein the modem MAC padding is configured as a frequency-based transmission parameter or a threshold configuration, and wherein the networking dummy data comprises any of:
   a private Internet Protocol (IP) address data;
   an IP packet data designated for a predetermined IP address or a random IP address, with a time-to-live (TTL) value of the IP packet data less than a predefined TTL value; and
   a service data designated for a predetermined server.

7. A method, comprising:
   transmitting, by a processor of an apparatus in a special mode, to a network a request for permission to perform an uplink (UL) transmission for a plurality of times;
   receiving, by the processor, from the network a grant; and
   performing, by the processor, the UL transmission to the network responsive to receiving the grant,
   wherein the transmitting of the request for the plurality of times comprises transmitting the request for the plurality of times at a frequency higher than a frequency at which the request to perform UL transmissions is transmitted to the network when the apparatus is in a normal operational mode, and
   wherein the special mode is an event-triggered mode, and
   wherein the transmitting of the request in the event-triggered mode comprises:
      receiving information from one or more information sources associated with the apparatus;
      predicting, based on the received information, a need to perform the UL transmission; and
      transmitting the request for the plurality of times responsive to the predicting,
   wherein the performing of the UL transmission comprises:
      determining that there is no buffered data to be transmitted in the UL transmission; and
      performing the UL transmission of any of:
         a modem medium access control (MAC) padding;
         a modem layer 2 control data, retransmission data or an invalid protocol data unit (PDU); and
         network dummy data,
   wherein the modem MAC padding is configured as a frequency-based transmission parameter or a threshold configuration, and
   wherein the networking dummy data comprises any of:
      a private Internet Protocol (IP) address data;

an IP packet data designated for a predetermined IP address or a random IP address, with a time-to-live (TTL) value of the IP packet data less than a predefined TTL value; and
a service data designated for a predetermined server.

8. The method of claim 7, wherein the predicting of the need to perform the UL transmission comprises detecting at least one of a plurality of predefined events based on the received information.

9. The method of claim 8, wherein the plurality of predefined events comprise:
detection of a touch of a screen of the apparatus;
activation of or performing of an operation by a gyroscope of the apparatus;
activation of or performing of an operation by an accelerometer of the apparatus;
detection of a press of a key on the apparatus;
receiving of an input by another device of the apparatus;
detection of an occurrence of a hardware event with respect to a hardware of the apparatus; and
detection of an occurrence of a software flow with respect to a software executed on the apparatus.

10. An apparatus, comprising:
a processor which, during operation, performs operations comprising:
transmitting, when the apparatus is in a special mode, to a network a request for permission to perform an uplink (UL) transmission for a plurality of times;
receiving from the network a grant; and
performing the UL transmission to the network responsive to receiving the grant,
wherein, in transmitting the request for the plurality of times, the processor transmit the request for the plurality of times at a frequency higher than a frequency at which the request for perform to perform UL transmissions is transmitted to the network when the apparatus is in a normal operational mode,
wherein the special mode is an event-triggered mode, a forced mode, or a background mode,
wherein, responsive to the special mode being the event-triggered mode:
in transmitting the request in the event-triggered mode, the processor performs operations comprising:
receiving information from one or more information sources associated with the apparatus;
predicting, based on the received information, a need to perform the UL transmission by detecting at least one of a plurality of predefined events based on the received information; and
transmitting the request for the plurality of times responsive to the predicting,
in performing the UL transmission, the processor performs operations comprising:
determining that there is no buffered data to be transmitted in the UL transmission; and
performing the UL transmission of any of:
a modem medium access control (MAC) padding;
a modem layer 2 control data, retransmission data or an invalid protocol data unit (PDU); and
network dummy data,
the modem MAC padding is configured as a frequency-based transmission parameter or a threshold configuration,
the networking dummy data comprises any of:
a private Internet Protocol (IP) address data;
an IP packet data designated for a predetermined IP address or a random IP address, with a time-to-live (TTL) value of the IP packet data less than a predefined TTL value; and
a service data designated for a predetermined server, and the plurality of predefined events comprise:
detection of a touch of a screen of the apparatus;
activation of or performing of an operation by a gyroscope of the apparatus;
activation of or performing of an operation by an accelerometer of the apparatus;
detection of a press of a key on the apparatus;
receiving of an input by another device of the apparatus;
detection of an occurrence of a hardware event with respect to a hardware of the apparatus; and
detection of an occurrence of a software flow with respect to a software executed on the apparatus,
wherein, responsive to the special mode being the forced mode:
in transmitting the request in the forced mode, the processor performs operations comprising:
entering the forced mode;
continuously transmitting the request for the plurality of times while in the forced mode without knowledge of any user data available for the UL transmission; and
exiting the forced mode to stop the continuously transmitting of the request,
the exiting the forced mode comprises exiting the forced mode responsive to an occurrence of any of a plurality of predefined events, and
the plurality of predefined events comprise:
expiration of a predetermined period for being in the forced mode;
receiving an input to start one operation; and
receiving another input to stop another operation,
in performing the UL transmission, the processor performs operations comprising:
determining that there is no buffered data to be transmitted in the UL transmission; and
performing the UL transmission of any of:
a modem medium access control (MAC) padding;
a modem layer 2 control data, retransmission data or an invalid protocol data unit (PDU); and
network dummy data,
the modem MAC padding is configured as a frequency-based transmission parameter or a threshold configuration, and
the networking dummy data comprises any of:
a private Internet Protocol (IP) address data;
an IP packet data designated for a predetermined IP address or a random IP address, with a time-to-live (TTL) value of the IP packet data less than a predefined TTL value; and
a service data designated for a predetermined server,
wherein, responsive to the special mode being the background mode:
in transmitting the request in the background mode, the processor performs operations comprising:
transmitting lower-priority data continuously or periodically to maintain UL transmission grants unless there is higher-priority data to be transmitted; and
transmitting the higher-priority data, in lieu of the lower-priority data, when the higher-priority data is available from an application.

11. The apparatus of claim 10, wherein the request comprises a scheduling request (SR) or a non-zero buffer status report (BSR).

* * * * *